Patented Oct. 10, 1933

1,929,950

UNITED STATES PATENT OFFICE 1,929,950

AMINE HYDROHALIDE MANUFACTURE

Newton Lamb, Saginaw, Mich., assignor to The Dow Chemical Company

No Drawing. Application September 14, 1929
Serial No. 392,743

12 Claims. (Cl. 260—130.5)

The present invention relates to amine hydrohalides, particularly to aromatic amine hydrohalides, and more particularly to the manufacture of aniline hydrochloride.

Hitherto, aniline hydrochloride has been prepared industrially in aqueous solution. For instance, aniline is dissolved in a concentrated aqueous hydrochloric acid solution to form aniline hydrochloride which crystallizes from said solution upon cooling, and is then separated and dried. The hydrochloride remaining in solution is obtained in reworking the mother liquors by repeated concentrations and crystallizations. The product obtained from said aqueous method is usually discolored or becomes so after standing a short time, and the yield of same is appreciably lowered by losses due to oxidation and/or decomposition of material and the several necessary operative steps as concentrations, crystallizations, filtrations, and dryings. Furthermore, the colored aniline hydrochloride solution is oftentimes decolorized with a material such as stannous chloride before the product is allowed to crystallize, such treatment thus adding a metal salt impurity to the solution.

Considerable effort has been directed to the production of a white aniline salt of high purity by the modification and improvement of a well known laboratory method for the preparation of amine hydrohalides, i. e. reacting substantially dry gaseous hydrogen halide on an amine dissolved in an organic solvent. Hoffman (Lassar Cohn; Arbeits Methoden, 4th Ed., 1907, Spl. part, pg. 127: Leopold Voss Pub.) obtained crystalline ethyl aniline hydrochloride by passing hydrochloric acid gas into an ether solution of the free base. Ullman (Ber. 31—1699; 1898) prepared the hydrochlorides of aniline, the toluidines, and xylidines, by conducting the above mentioned gaseous acid into the respective bases dissolved in carbon tetrachloride. Lassar Cohn (loc. cit.) stated that in all such cases, ether may be replaced by benzene, etc.

The use of such solvents involves one or more of the following disadvantages; fire hazard, condensation by-product formation, solvent loss, danger of poisoning by either base or solvent or both, particularly by aqueous solutions of such, impurities due to presence of water, and others.

I have now found that said organic solvent method may be so modified and improved as to constitute a useful process for the industrial production of amine hydrohalides, such improvement involving the steps of reacting between the amine and hydrogen halide gas in a non-inflammable volatile organic solvent, under substantially anhydrous conditions, and directly evaporating such solvent from the amine hydrohalide formed thereby, or separating the greater part of liquid from the product, evaporating and condensing the residual solvent, and absorbing the uncondensed vapors in a liquid to be reused in the process.

Among the objects of my invention are the elimination of the above-mentioned disadvantages, and the preparation of a pure product which will dissolve in water to form a clear solution, has a sharp melting point, and which has a white color. Other objects and advantages will become apparent as the description proceeds.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

For the purpose of illustration, I shall describe my improved method as applied to the manufacture of aniline hydrochloride. Aniline is dissolved in a suitable, comparatively low-boiling, substantially water insoluble solvent such as benzene or carbon tetrachloride or a mixture of the latter two substances. In the latter case, it is preferable that the benzene and carbon tetrachloride be present in an approximate ratio of about one to two parts by volume, respectively, which mixture composition represents approximately the non-inflammable composition ratio of the two components. The amount of aniline dissolved in the solvent is such as to provide a suitable working concentration. The solution may then be stirred or agitated in some suitable manner, preferably in an apparatus which may be closed and which substantially eliminates the presence of impurities, particularly materials tending towards the production of metallic salts. The reaction is accordingly preferably carried out in a glass or enamelled lined vessel or equivalent, to avoid metal container actions and influences. The latter salts, such as iron chloride, may act as oxygen carriers and promote oxidation of the amine, such oxidation causing the formation of a dark colored product. During the stirring or agitation, substantially anhydrous hydrogen chloride gas is conducted into the solution or over its surface until there is an excess of such hydrogen halide gas present, such excess serving to prevent either the presence of unreacted aniline or the formation of other amine salt than the normal aniline hydrochloride. The said gas reacts with the base dissolved in the solvent, whereby aniline hydrochloride forms and precipitates as a finely divided crystalline material. The mutual contacting, particularly towards the end of the reaction between hydrogen chloride and amine, may be accelerated by the use of pressure, if desired. The stirring will preferably be of a character to effectively contact the gas and liquid phases present.

After the reaction is substantially completed, the reaction mixture containing the product may be filtered, centrifuged, or allowed to stand and settle. In the latter case, the supernatant liquid may be decanted or siphoned into another receiver or reactor to be used in another run, after which decantation, agitation may be restarted and the residual solvent containing excess hydrogen halide gas and a small amount of product, is distilled off from the reaction mixture in the original reactor by means of application of heat and under a suitable pressure, the latter preferably being either ordinary or a reduced pressure. Previously to solvent evaporation, the product may be washed in the reactor with fresh solvent, followed by decantation of the wash liquor. However, decantation of solvent may be dispensed with, and said solvent distilled directly from the reaction mixture after the reaction has been substantially completed. During such distillation the mixture will be preferably stirred to prevent formation of a cake and to bring all portions into heat receiving relation with the heating element. After the solvent evaporation, the product, i. e. aniline hydrochloride, is discharged into a container, and is then ready for immediate packing. The so obtained product is pure, dry, white, crystalline, of sharp melting point, and gives a clear water solution, and superior in such respects to the product usually obtainable in the market.

In order to prevent loss of solvent and reaction components, uncondensed vapors from the solvent evaporation and condensation steps may be conducted into and absorbed in a liquid which may be utilized in another run. For instance, in the preparation of aniline hydrochloride, the aforesaid uncondensed vapors, containing solvent and hydrogen chloride, are absorbed in aniline, which latter may be employed in another run as starting material for the preparation of aniline hydrochloride. The aniline solvent and hydrogen chloride are thus conserved and losses prevented.

A preferred mode of procedure for carrying out my invention is illustrated in the following examples, but it is understood that such examples are not to be interpreted as a limitation upon the invention.

*Example 1*

15 parts aniline were dissolved in 100 parts by volume of benzene, which solution was then stirred and practically dry hydrogen chloride gas passed over the surface of the liquid. After the reaction was substantially completed, the mixture was allowed to stand, the supernatant liquid decanted, and the residual solvent distilled off by application of heat and under a somewhat reduced pressure, with conjoint agitation. The resulting aniline hydrochloride (M. P. 198° C.) was discharged from the reactor into a suitable container.

*Example 2*

15 parts aniline (freshly distilled) were dissolved in 100 parts by volume of a mixed solvent composed of one part benzene to two parts carbon tetrachloride by volume, which solution was then stirred and practically dry hydrogen chloride gas passed over the surface of the liquid. After the reaction was substantially completed, the solvent was distilled off by application of heat and under a somewhat reduced pressure, with conjoint agitation. The product, i. e, aniline hydrochloride (M. P. 198° C.) was discharged from the reactor.

Other amine hydrohalides were prepared by the method used in Example 2, among which products may be mentioned, mono-ethyl aniline hydrochloride, di-ethyl aniline hydrochloride, ortho-toluidine hydrobromide, mono-methyl amine hydrochloride, and mono-ethyl amine hydrochloride.

The herein described improvements of operating the reaction step in a closed reactor of the type stated and evaporating the solvent in the latter, lead to the formation of a pure, white, dry, product which is completely water soluble, and which may be discharged into a container from the reactor in which the reaction components are initially placed. By operating the procedure in the herein described manner, contamination of the reaction mixture by outside influences such as dust and air, are practically eliminated. As aforementioned, the amine may be oxidized under such influences, especially catalytically, with the possible production of a dark colored product. Furthermore, industrial hazards such as fire, or benzene and/or aniline poisoning are practically eliminated, and such steps as washing, filtering, whirling and the like, involving losses and hazards are absent.

Moreover, solvent evaporation as herein described, is of added importance in that such solvents as benzene and carbon tetrachloride act as efficient dehydrating agents by carrying out traces of water if the latter be accidentally or unavoidably present, during such evaporation step. If desired, a small current of hydrogen halide gas may be admitted into the solvent during evaporation of the latter, to insure a sufficiency of such acid gas and a complete reaction.

The aforementioned mixture of benzene and carbon tetrachloride may be advantageously used as solvent in the present improved process due to its non-inflammability. Benzene alone as solvent has the disadvantage of being very inflammable. I have found that under certain conditions, when carbon tetrachloride alone is used, the aniline hydrochloride product is not completely soluble in water, has a slightly lower melting point, and is slightly discolored, probably due to impurities such as condensation products formed by interaction between aniline and carbon tetrachloride. However, by dilution of the latter with benzene, and under the herein specified conditions, such impurities are not formed and the product as already stated is completely water-soluble, has a higher melting point, and is white.

Other equivalent volatile solvents or mixture of two or more solvents, e. g. petroleum ether and other hydrocarbons, may be employed.

I do not limit my invention to the reaction components specifically abovementioned. However, such components as well as the solvent, should be essentially anhydrous. Other equivalent primary, secondary, or tertiary amines, e. g. aliphatic amines, such as butyl amine and dibutyl amine, or aromatic amines such as the anilines substituted by at least one alkyl group in the ring and/or on the nitrogen, for instance, toluidines, xylidines, or N-alkyl anilines, may be prepared in like manner with the same advantage.

Moreover, either gaseous hydrogen bromide or hydrogen chloride may be employed, since the hydrobromides and hydrochlorides of amines are substantially equivalent with regard to the process elaborated herein. Hence the term "hydrohalide" in the claims is to be understood as referring to either a hydrobromide or hydrochloride, and the expression "hydrogen halide" is to be understood to represent the corresponding hydrogen bromide or hydrogen chloride.

Briefly stated, my invention involves the preparation of hydrohalide salts of amines by reaction between a gaseous hydrogen halide and an amine under substantially anhydrous conditions, and preferably in a mixed volatile non-inflammable solvent such as one composed of benzene and carbon tetrachloride, evaporating the reaction mixture, or the residue after decantation of a portion of the solvent, to dryness in the reactor, absorbing uncondensed solvent vapors in a liquid to be reused in the process and discharging pure dry product from the vessel in which the solvent evaporation has been carried out.

Other modes of applying the principle of my invention may be employed instead of those explained, change being made as regards the process herein disclosed, provided the means stated by any of the following claims or the equivalent of such stated means be employed.

I therefore particularly point out and distinctly claim as my invention:—

1. The method of making an amine hydrohalide, which comprises reacting between an amine dissolved in a solvent composed of approximately one part benzene to approximately two parts carbon tetrachloride by volume, and a gaseous hydrogen halide.

2. The method of making an aromatic amine hydrohalide, which comprises reacting between an aromatic amine dissolved in a solvent composed of approximately one part benzene to approximately two parts carbon tetrachloride by volume, and a gaseous hydrogen halide.

3. The method of making aniline hydrochloride, which comprises reacting between aniline dissolved in a solvent composed of approximately one part benzene to approximately two parts carbon tetrachloride by volume, and gaseous hydrogen chloride.

4. The method of making aniline hydrochloride, which comprises reacting between aniline dissolved in a solvent composed of approximately one part benzene to approximately two parts carbon tetrachloride by volume, and gaseous hydrogen chloride, evaporating the solvent from the reaction mixture, and absorbing uncondensed vapors in aniline.

5. The method of making aniline hydrochloride, which comprises reacting between aniline dissolved in a solvent composed of approximately one part benzene to approximately two parts carbon tetrachloride by volume, and gaseous hydrogen chloride, separating a portion of liquid from the solid aniline hydrochloride so formed, evaporating the residual solvent, and absorbing uncondensed vapors in aniline.

6. In a method of making an amine hydrohalide, the steps which consist in vaporizing excess hydrogen halide and organic solvents from the amine hydrohalide product, and absorbing the vapors in a fresh quantity of the amine to form a solution suitable for employment in making an additional quantity of the above product.

7. In a method of making an aniline hydrohalide, the steps which consist in vaporizing excess hydrogen halide and organic solvents from the aniline hydrohalide product, and absorbing the vapors in a fresh quantity of the amine to form a solution suitable for employment in making an additional quantity of the above product.

8. In a method of making aniline hydrochloride, the steps which consist in vaporizing excess hydrogen chloride and organic solvents from the aniline hydrochloride product, and absorbing the vapors in a fresh quantity of aniline to form a solution suitable for employment in making an additional quantity of the above product.

9. In a method of making aniline hydrochloride from gaseous hydrogen chloride and aniline in a volatile organic solvent, the improvement of reacting said gaseous hydrogen chloride with aniline dissolved in a non-inflammable solvent composed of approximately one part benzene to approximately two parts carbon tetrachloride by volume, removing water if present by distilling solvent from the aniline hydrochloride, absorbing uncondensed acid gas and solvent vapors in aniline, and returning the latter to the process.

10. In a method of making an amine hydrohalide from a gaseous hydrogen halide and an amine dissolved in a volatile organic solvent, the improvement of reacting the gaseous hydrogen halide with an amine dissolved in an organic solvent composed of approximately one part benzene to approximately two parts carbon tetrachloride by volume, removing water, if present, by distilling the solvent from the amine hydrohalide, absorbing uncondensed acid gas and solvent vapors in a fresh quantity of the amine, and returning the latter to the process.

11. In a method of making an aromatic amine hydrohalide from a gaseous hydrogen halide and an aromatic amine dissolved in a volatile organic solvent, the improvement of reacting the gaseous hydrogen halide with an aromatic amine dissolved in an organic solvent composed of approximately one part benzene to approximately two parts carbon tetrachloride by volume, removing water, if present, by distilling the solvent from the aromatic amine hydrohalide, absorbing uncondensed acid gas and solvent vapors in a fresh quantity of the aromatic amine, and returning the latter to the process.

12. In a method of making an aniline hydrohalide from a gaseous hydrogen halide and an aniline dissolved in a volatile organic solvent, the improvement of reacting the gaseous hydrogen halide with an aniline dissolved in an organic solvent composed of approximately one part benzen to approximately two parts carbon tetrachloride by volume, removing water, if present, by distilling the solvent from the aniline hydrohalide, absorbing uncondensed acid gas and solvent vapors in a fresh quantity of the aniline, and returning the latter to the process.

NEWTON LAMB.